(12) United States Patent
Krause et al.

(10) Patent No.: US 6,844,144 B2
(45) Date of Patent: Jan. 18, 2005

(54) SINGLE SLIDER AIR BEARING PROCESS USING POLYMER BRUSH FORMATION

(75) Inventors: Rainer Klaus Krause, Kostheim (DE); Markus Schmidt, Seibersbach (DE); Stefan Seifried, Nidderau (DE); Wolfgang Egert, Bodenheim (DE); Eva Urlaub, Hochheim (DE); Ashok Lahiri, Mainz (DE)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 141 days.

(21) Appl. No.: 10/229,792

(22) Filed: Aug. 27, 2002

(65) Prior Publication Data

US 2004/0043335 A1 Mar. 4, 2004

(51) Int. Cl.$^7$ .................. G03C 5/00; G11B 17/32
(52) U.S. Cl. ............ 430/320; 430/323; 430/324; 204/192.34; 360/234.3; 360/235.1; 360/235.4
(58) Field of Search .................. 430/320, 323, 430/324; 204/192.34; 360/234.3, 235.1, 235.4

(56) References Cited

U.S. PATENT DOCUMENTS

| | | | |
|---|---|---|---|
| 4,430,504 A | 2/1984 | Reuter et al. | 556/482 |
| 5,192,592 A | 3/1993 | Shay | 427/358 |
| 5,792,592 A | 8/1998 | Uchida et al. | 430/313 |
| 5,969,910 A | 10/1999 | Imagawa et al. | 360/113 |
| 6,004,472 A | 12/1999 | Dorius et al. | 216/22 |
| 6,178,066 B1 | 1/2001 | Barr | 360/126 |
| 6,258,515 B1 | 7/2001 | Sato et al. | 430/320 |
| 6,260,256 B1 | 7/2001 | Sasaki | 29/603.1 |
| 2002/0163762 A1 * | 11/2002 | Levi et al. | 360/236.2 |
| 2004/0008446 A1 * | 1/2004 | Schmidt | 360/126 |

OTHER PUBLICATIONS

L. Yan, et al., "Patterning Thin Films of Poly(ethylene Imine) on a Reactive SAM Using Microcontact Printing" Langmuir 1999, vol. 15, No. 4, pp. 1208–1214.
M. Biesalski et al., "Preparation and Characterization of a Polyelectrolyte Monolayer Covalently Attached to a Planar Solid Surface", Macromolecules 1999, vol. 32, No. 7, pp. 2309–2316.
M. Husseman, et al., "Controlled Synthesis of Polymer Brushes by "Living" Free Radical Polymerization Techniques", Macromolecules, vol. 32, No. 5, 1999, pp. 1424–1431.
O. Prucker et al., "Surface–attached Polymer Networks", Mat. Res. Soc. Symp., vol. 629, 2000, Materials Research Society, pp. FF9.8.1 thru FF9.8.6.
M. Husseman et al., "Surface–initiated Polymerization for Amplification of Self–Assembled Mono–layers Patterned by Microcontact Printing", Communications, Angew. Chem. Int. Ed. 1999, vol. 38, No. 5, pp. 647–649.

* cited by examiner

Primary Examiner—John A. Mcpherson
Assistant Examiner—Daborah Chacko-Davis
(74) Attorney, Agent, or Firm—Lewis L. Nunnelley

(57) ABSTRACT

A method of constructing an air bearing on a single slider used as a support for a magnetic recording head is described. A recessed surface of the air bearing is constructed by: applying a polymerization initiator (preferably azomonochlorsilane), forming a pattern in the initiator, forming a polymer brush, and ion milling. The application of the polymerization initiator may be from solution or by stamping.

16 Claims, 15 Drawing Sheets

SINGLE SLIDER AIR BEARING PROCESS USING POLYMER BRUSH FORMATION

BACKGROUND OF THE INVENTION

1. Field of the Invention

This invention relates in general to air bearing sliders used in magnetic recording disk drives, and more particularly to a process for using polymer brush formation in single slider fabrication.

2. Description of the Background Art

Disk drives using magnetic recording of digital information store most of the information in contemporary computer systems. Disk drives have at least one rotating disk with discrete concentric tracks of data. There is at least one recording head typically having a separate write element and read element for writing and reading the data on the tracks. The recording head is constructed on a slider and the slider is attached to a suspension. The combination of the recording head, slider, and suspension is called a head gimbal assembly. In addition, there is an actuator which positions the recording head over the specific track of interest. The actuator first rotates to seek the track of interest and after positioning the recording head over that track maintains the recording head in close registration to that track. The disk in a disk drive has a substrate and a magnetic layer on the substrate for magnetic recording.

The slider carrying the recording head has a surface upon which an air bearing is constructed. The purpose of the air bearing is to allow the slider to float on a cushion of air and to be positioned close to the disk surface. The density of recorded data on the disk surface generally increases with each new disk drive product. As the density of recorded data increases there is an continuing need to improve the tolerance of the flying height of the finished slider over the surface of the disk and to improve the dimensional control of the recording transducers.

Recording heads are constructed on a wafer using thin film methods. After the construction of the recording heads, the wafer is sliced into rows. Each row will typically have 20 to 80 recording heads. The row is first lapped in order to give the final dimensions to the read and write elements. For very high recording density, row lapping does not deliver the required dimensional control of stripe height for the read element and throat height for the write element. After lapping, the air bearings are then simultaneously constructed on one surface of the row. First, a relatively thick layer of photoresist is deposited on the surface by either spin coating or applying a sheet of photoresist. The relatively thick layer of photoresist obtained by spin coating or by applying a sheet limits the feature size which can be created on the air bearing. Alternatively, a polymer coating may be applied to the row by absorbing polymers onto the surface. This absorption procedure with pre-formed polymer molecules generally results in coatings which are too thin to resist the subsequent milling or etching. The deposition of the coating is followed by pattern creation and milling or etching.

If the rows are first sliced into individual sliders and then the construction of the air bearing and the lapping is performed on each single slider, the precision of the air bearing features and the dimensional control of the recording heads can be significantly improved. However, the methods used to construct air bearings on unsliced rows are not as appropriate for use on a single slider. For example, spin coating photoresist onto a single slider is very difficult to control. Once the rows are sliced into individual sliders and placed on carriers, the methods used for lithography must be suitable for use on single sliders.

From the foregoing it will be apparent that there is a need for a method of constructing an air bearing which is suitable for use on a single slider.

SUMMARY OF THE INVENTION

In a preferred embodiment, the invention provides a method for constructing an air bearing which is suitable for use on a single slider.

In one embodiment, a thin polymerization initiator layer is applied to the surface of the slider. UV light is then passed through a mask to create a desired pattern in the starter layer. After this patterning, a polymer brush is then constructed over the desired areas of the surface of the slider. Ion milling is then used to remove a portion of the exposed substrate material of the slider to create a recessed area. One or more recessed areas thus created form a portion of the air bearing.

In an alternative embodiment, the thin polymerization initiator layer is applied using a stamping method. In this embodiment it is not necessary to expose with UV light to create the desired pattern. The polymer brush formation and subsequent ion milling is performed as before.

The embodiments provided by this invention are applicable to sliders constructed from composite materials such as alumina and titanium carbide as well as materials with large scale crystalline structure such as silicon. A number of materials may be used to construct the layer of polymerization starter. An especially effective material is azomonochlorsilane.

Other aspects and advantages of the present invention will become apparent from the following detailed description, which when taken in conjunction with the accompanying drawings, illustrate by way of example the principles of the invention.

DETAILED DESCRIPTION OF THE INVENTION

The present invention provides an effective method for constructing an air bearing which is suitable for use on a single slider. The method allows the sliders to be sliced from the rows and lapped before the construction of the air bearing. Furthermore the thickness of the polymer layer may be optimized for ion milling or etching operations.

Figure 1:
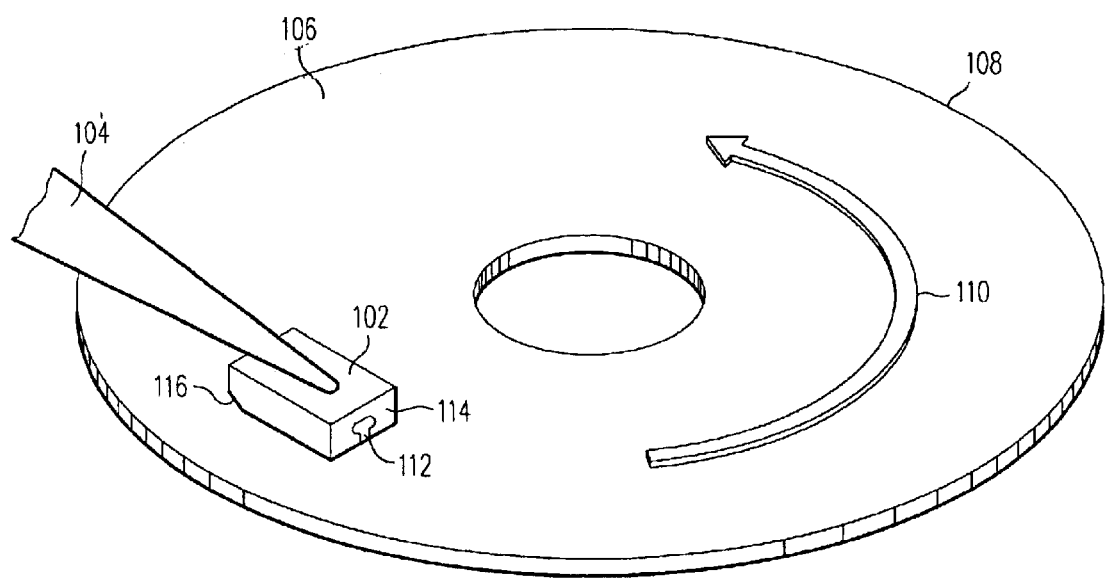
FIG. 1 illustrates a slider as flying over the surface of a spinning disk.

FIG. 1 shows a slider 102 as attached to a suspension 104 and flying above the surface 106 of the disk 108. When operating, the disk 108 is spinning in a direction given by reference number 110. The slider 102 typically has a side (not shown) upon which the air bearing is constructed. This side of the slider is sometimes referred to as the air bearing surface although the air bearing surface itself is usually comprised of a plurality of recessed surfaces. The air bearing side of the slider is adjacent to the disk surface 106. The recording head 112 is constructed on the trailing surface 114 of the slider 102. At the intersection of the slider side with the air bearing (not shown) and the front surface (not shown) there is usually a tapered region 116. The tapered region 116 helps in forming a uniform air bearing.

Figure 2A:
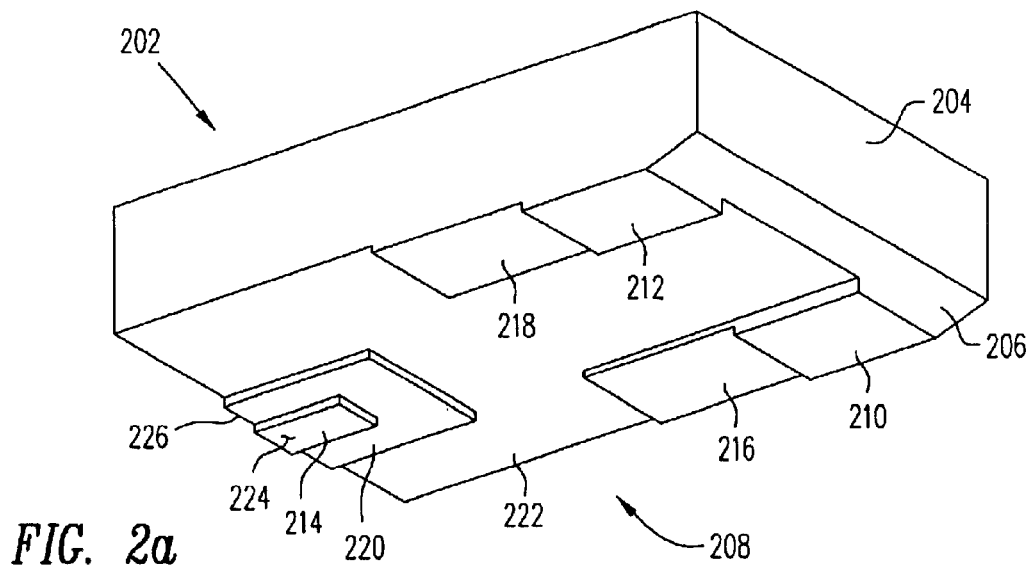
FIG. 2a illustrates a perspective view of an a finished slider.

FIG. 2a shows a perspective drawing of a typical slider 202. FIG. 2a shows the front surface 204 of the slider 202, the tapered region 206, and the air bearing 208. There are many air bearing designs differing somewhat in geometrical features. The common aspect of air bearing designs is that most are comprised of two or more surfaces which are recessed or offset from one another. In the example shown in FIG. 2a there are three such surfaces. The first surface is shown as segments 210, 212, and 214. These segments are not contiguous but lie in approximately the same plane and therefore are referred to a single surface. The next surface is indicated by segments 216, 218, and 220. These segments are also not contiguous but lie in approximately the same plane. The plane defined by segments 216, 218, and 220 is recessed compared with the plane defined by segments 210, 212, and 214. The recessed or offset distance varies according to the design requirements of the air bearing and is typically from about 0.1 to 0.5 $\mu$m. The third surface 222 in FIG. 2a is typically from about 0.5 to 4.0 $\mu$m recessed or offset from the plane defined by segments 210, 212, and 214. The location of the recording head 224 is near the trailing edge 226 of the air bearing 208.

Figure 2B:
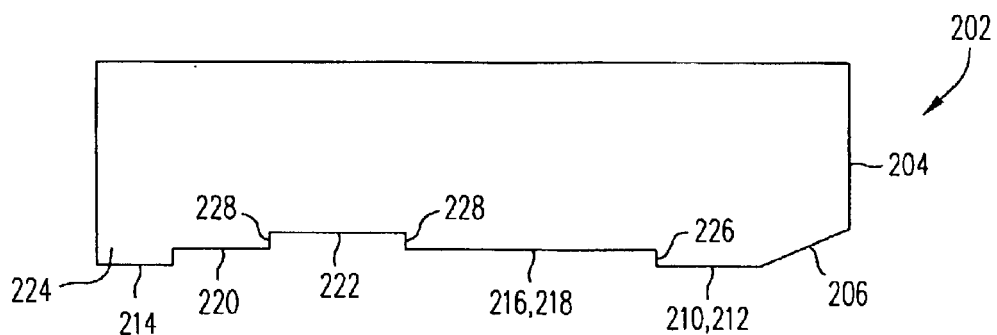
FIG. 2b illustrates a side view of the finished slider.

FIG. 2b illustrates a side view of the slider 202. The front surface 204 and the tapered region 206 are viewed in profile. The recessed distance 226 of the plane defined by segments 210, 212, 214 and the plane defined by segments 216, 218, and 220 is illustrated. Also the recessed distance 228 of the plane defined by segments 216, 218, 220 and the plane shown by reference number 222 is illustrated.

Figure 2C:
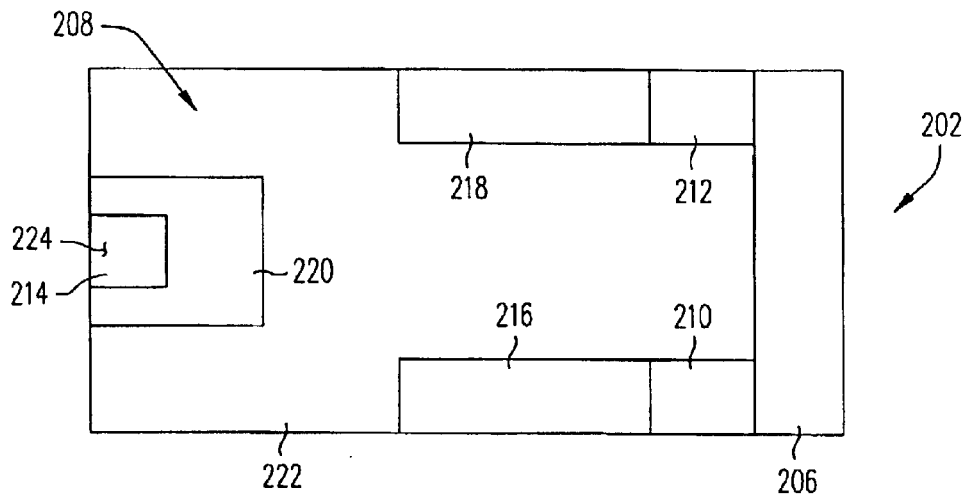
FIG. 2c illustrates a view of the air bearing side of the slider.

FIG. 2c illustrates a view of the air bearing 208 side of the slider 202. The tapered region 206 is illustrated. The surface defined by segments 210, 212, and 214 is illustrated. The surface defined by segments 216, 218 and 220 is illustrated. And finally, the surface 222 is illustrated.

The formation of a polymer brush is effective in creating the desired pattern on the slider surface which is to be subjected to ion milling. The use of a polymer brush allows the photo structuring of the desired pattern to be decoupled with the etch resistance of the polymer film. Another advantage of using a polymer brush is that a surface coating can be achieved by growing the polymer without the need for spincoating. This advantage is particularly important when processing single sliders.

Figure 3A:
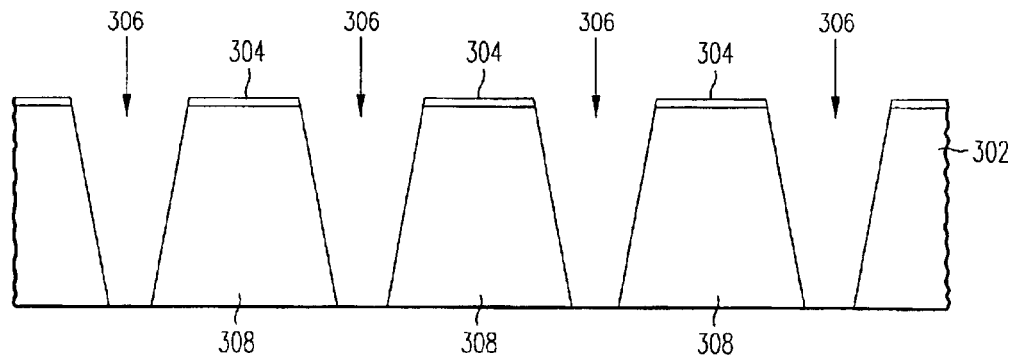
FIG. 3a illustrates the formation of sliders from a silicon wafer.
Figure 3B:
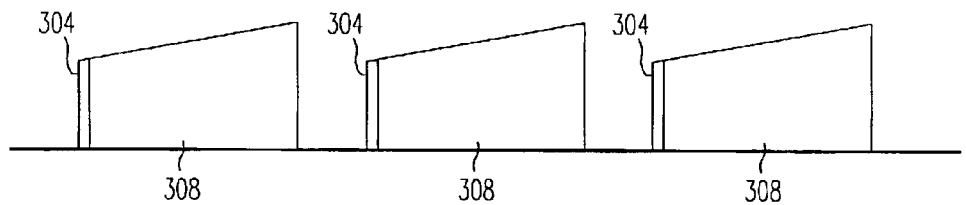
FIG. 3b illustrates the placement of individual sliders prior to air bearing formation.
Figure 3C:
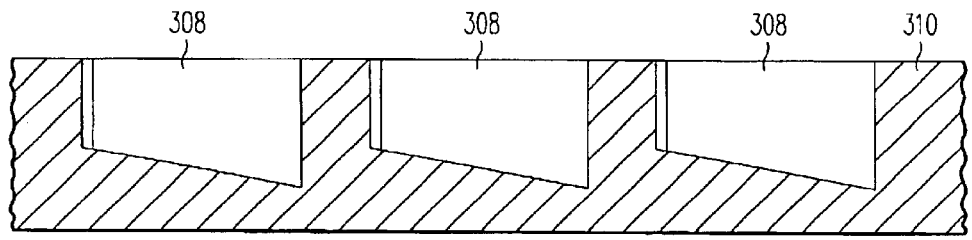
FIG. 3c illustrates embedding individual sliders in a relatively soft backing prior to air bearing formation.
Figure 3D:
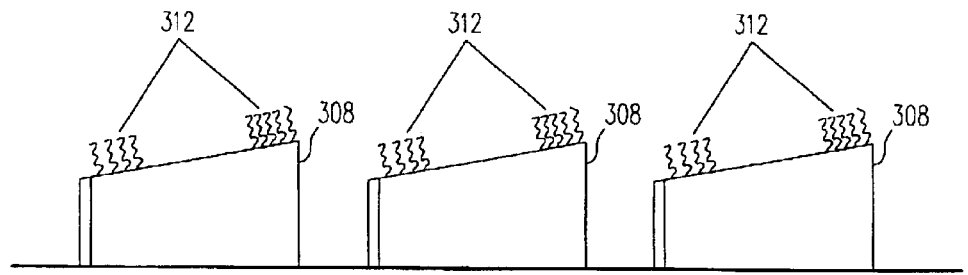
FIG. 3d illustrates the formation of polymer brushes on individual sliders.

An example of some of the advantages of the invention is illustrated in FIGS. 3a, b, c, and d. The illustrations in FIGS. 3a, b, c, and d are not to scale. In FIG. 3a the use of silicon as the substrate material is illustrated. As illustrated in FIG. 3a, the recording heads 304 have been deposited on a silicon substrate 302 and deep trench reactive ion etching has been used to form trenches 306 between the recording heads 304. The result is to separate individual sliders 308 from the silicon substrate 302. However, this process tends to form trapezoidal shaped trenches 306 into the silicon 302. Thus the silicon sliders 308 tend to have a trapezoidal shape. After a group of trapezoidal shaped individual sliders are placed on a backing in preparation for forming the air bearing, the surface profile has a sawtooth structure as illustrated in FIG. 3b. This sawtooth structure is an undesirable profile for applying a polymer by a conventional method such as spin coating. One solution is to planarize the surfaces to receive the air bearing by imbedding the sliders 308 into a relatively soft backing 310 as shown in FIG. 3c. However the sliders 308 must be recovered after being thus embedded. A much more desirable solution is to use a method utilizing a polymer brush 312 as illustrated in FIG. 3d. The use of the polymer brush 312 method separates the method used to form the individual sliders from the process used to form the air bearings.

Figure 4A:
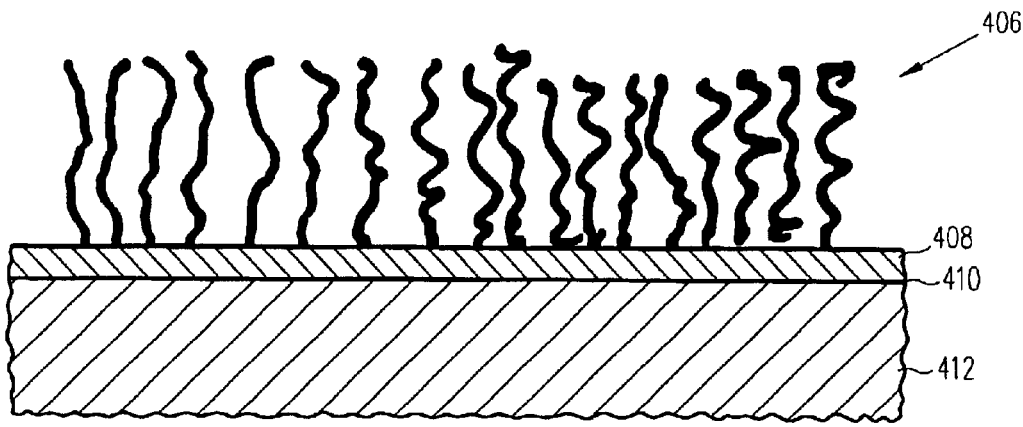
FIG. 4a illustrates a cross sectional view of a polymer brush.

FIG. 4a illustrates a diagram of a polymer brush. A polymer brush 406 is formed by first applying a layer of polymerization initiator 408 to the surface 410 of the slider 412. One example of an effective polymerization initiator is azomonochlorsilane. Ideally, the polymerization initiator 408 covalently bonds to the surface of the slider, specifically to —OH groups on the surface, and forms layer onto which monomer molecules may begin to polymerize. Surfaces of sliders usually have a thin oxide layer containing —OH groups. Usually humidity in the air is enough to generate a sufficient amount of —OH groups, however a hydrolization procedure may be used to increase the density of —OH groups. When using a silicon substrate, a layer of silicon oxide may first be applied and then hydrolysed.

Figure 4B:
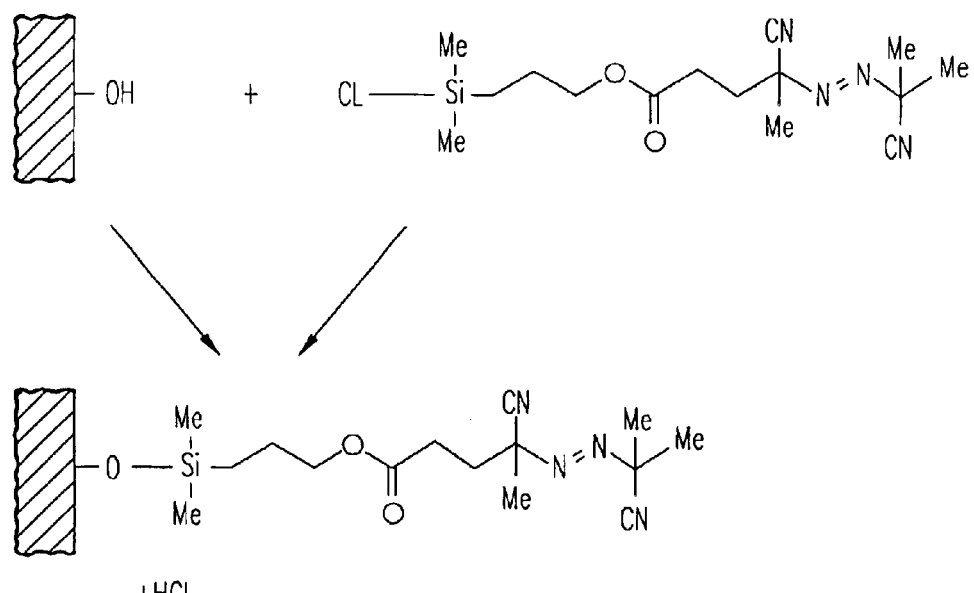
FIG. 4b illustrates the bonding of azomonochlorsilane to —OH groups on the slider surface.
Figure 4C:
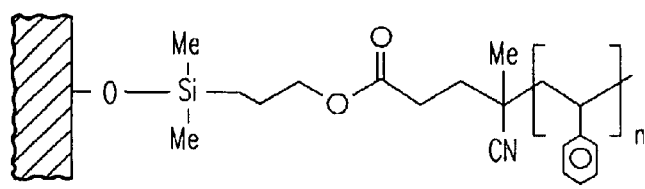
FIG. 4c illustrates a polymer molecule constructed from styrene monomers.

A polymerization initiator 408, such as azomonochlorsilane, bonds to the —OH groups on the surface 410 of the slider 412, forms a monomer layer 408 with a thickness of typically between 1 and 5 nm, promotes the polymerization of suitable monomers, and is easily deactivated with UV light. A schematic diagram illustrating the reaction of azomonochlorsilane with a surface containing —OH groups is illustrated in FIG. 4b. FIG. 4c illustrates the chemical structure of an exemplary polymer brush which was made using styrene monomers. The polymeric initiation capability of the azomonochlorsilane may be deactivated by exposure to UV light. Suitable monomers include styrene, methacrylate, or other polymeric monomers known to those skilled in the art. Monomers having aromatic ring structures generally result in polymers having superior etch resistance. After deposition of a layer of polymerization initiator, the slider is exposed to a mixture of the monomer molecules and a free initiator such as AIBN (2-2'-azo-bis-isobutyrylnitrile) and polymer growth proceeds to the desired thickness. Reaction rates are suitable at mildly elevated temperatures of around 60 C. One advantage of this method is that the polymer coating is not applied by spin coating or pressing a sheet of a polymer; both of these are difficult operations with single sliders. The thickness of the final photoresist layer may be controlled by the density of attached initiator molecules or more easily controlled by the exposure time at elevated temperature to the polymeric monomers. The thickness range of the polymer brush can be controlled over a wide range. When constructing air bearings a useful thickness range of the brush is about 0.5 $\mu$m to about 5 $\mu$m. The ability to control the thickness and the uniformity are advantages when optimizing the tradeoff between feature resolution and resistance to ion milling and etching. After formation of the polymer brush, a washing step with appropriate solvent is performed to remove unbound free polymer. The definition and resolution of the final air bearing features depends primarily on the thin layer of polymerization initiator and is much less dependent on the much thicker layer of polymer.

In a further refinement, cross linking is induced between the polymer brush molecules by incorporating photoreactive groups and subsequently irradiating with UV light. The resulting cross linked polymers are more resistant to subsequent ion milling.

An embodiment of the invented method for constructing an air bearing is illustrated in FIGS. 5a through FIG. 5m. The illustrations in FIGS. 5a–m are not to scale. The slider substrate material in most common use is a composite of alumina and titanium carbide. However, the invention is equally useful for sliders constructed from other materials such as crystalline silicon. The etch rates for these materials are different and accordingly the optimum thickness of the polymer brush would vary depending on the substrate material.

Figure 5A:
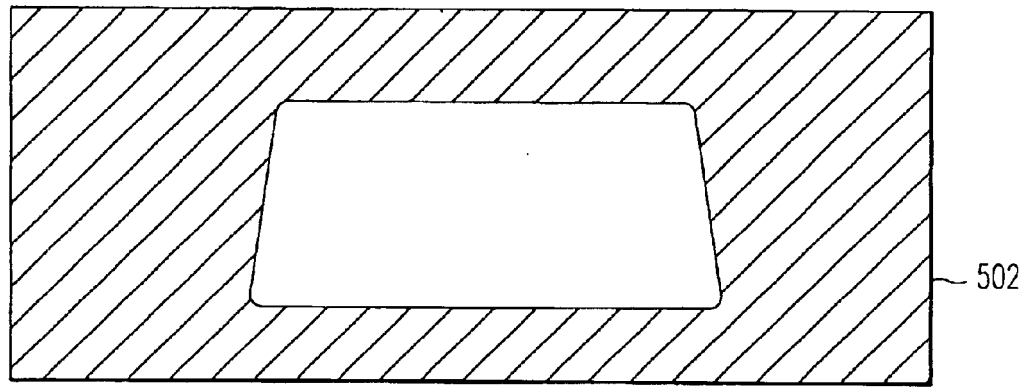
FIG. 5a illustrates a single slider upon which an air bearing is to be constructed.
Figure 5B:
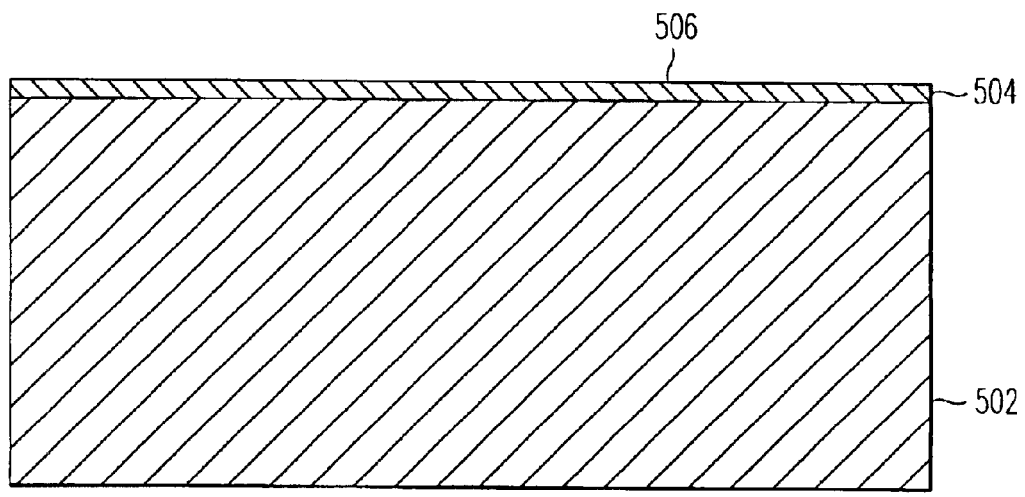
FIG. 5b illustrates the single slider after a layer of polymerization initiator has been deposited.
Figure 5C:
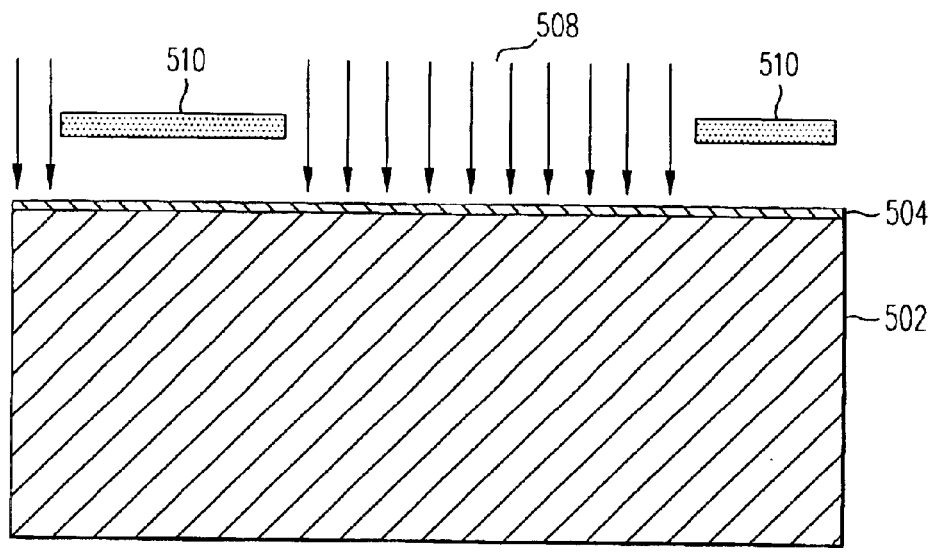
FIG. 5c illustrates exposure of the slider to UV light through a mask.
Figure 5D:
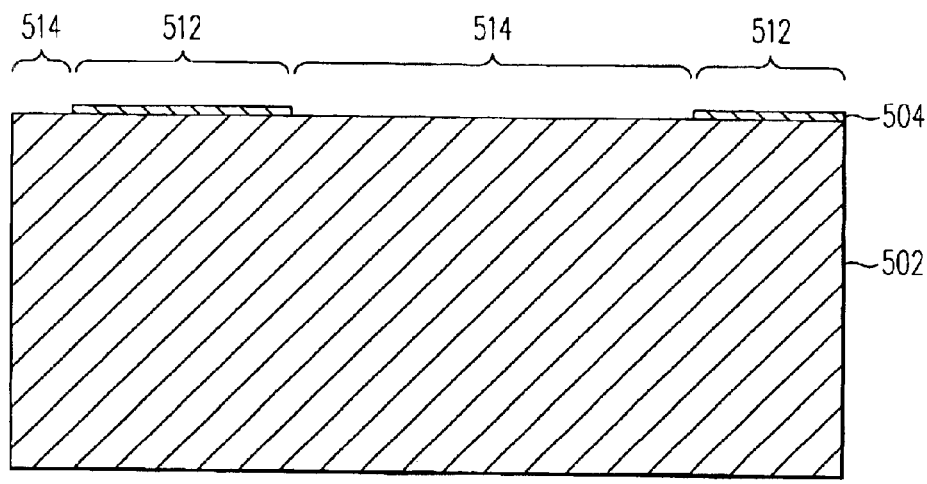
FIG. 5d illustrates the single slider after removal of the exposed portions of the layer of polymerization initiator.
Figure 5E:
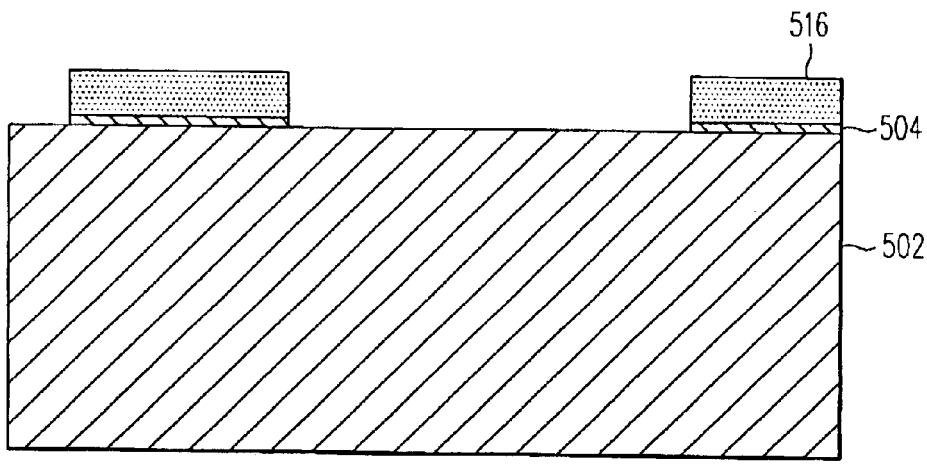
FIG. 5e illustrates the formation of a polymer brush.

FIG. 5a illustrates a cross sectional view of a single slider 502. FIG. 5b shows the slider 502 after applying a thin layer of a polymerization initiator 504 from a solution. The layer of polymerization initiator 504 is applied to the side 506 of the slider upon which the air bearing will be constructed. FIG. 5c shows the slider 502 with the layer of polymerization initiator 504 exposed to UV light 508 through a mask 510. The exposure to UV light 508 through the mask 510 results in a pattern being generated in the layer of polymerization initiator 504. Referring to FIG. 5d, the regions 514 of the layer of polymerization initiator 504 which were exposed to the UV light 508 loose the ability to start polymerization. The regions 512 of the layer of polymerization initiator 504 which were not exposed to UV light 508 remain active as a polymeric growth initiator. Referring to FIG. 5e, the slider 502 with the patterned layer of polymerization initiator 504 is now exposed to appropriate monomer molecules to form the polymer layer. Polymerization on the layer of polymerization initiator is usually started by a heating treatment. The polymer molecules thus grown tend to assume a perpendicular orientation to the slider surface thus creating a polymer "brush" 516.

Figure 5F:
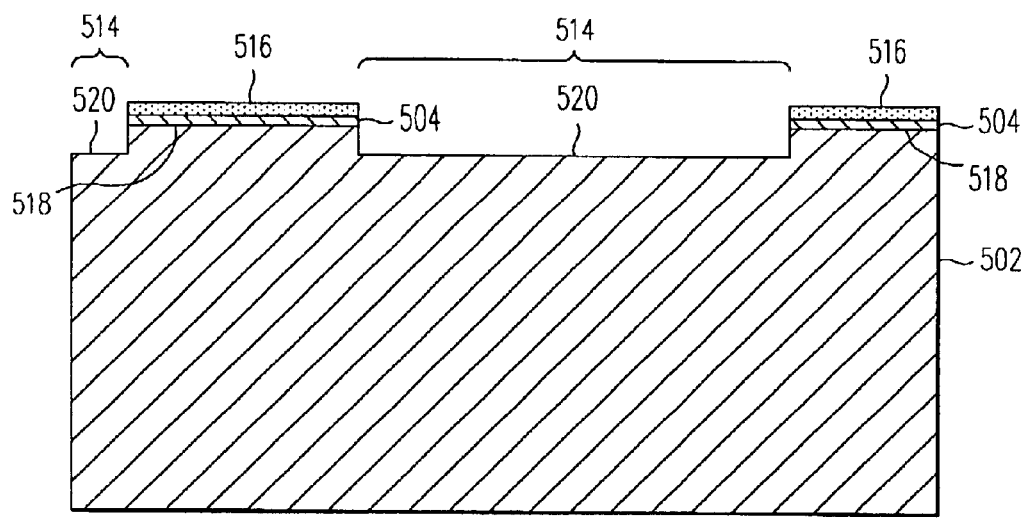
FIG. 5f illustrates the slider after ion milling.
Figure 5G:
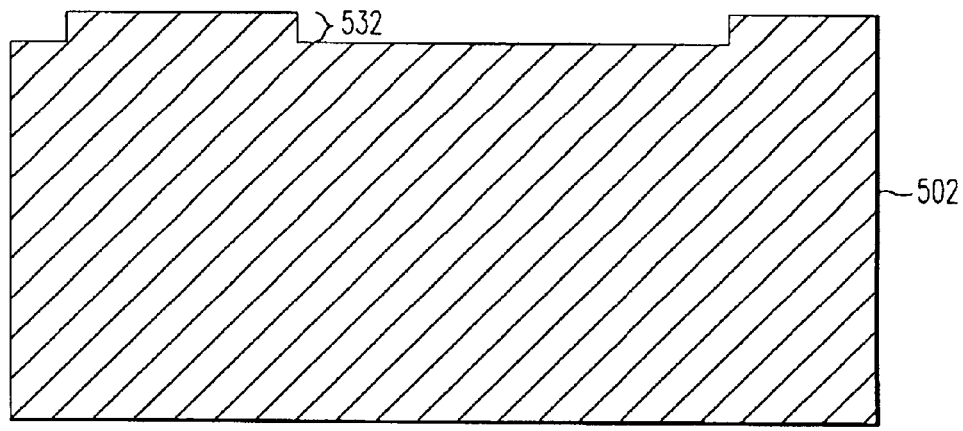
FIG. 5g illustrates the slider after removal of the polymer brush and the layer of polymerization initiator.

FIG. 5f illustrates the slider 502 after ion milling. The polymer molecules 516 are eroded somewhat during the ion milling, however the surface 518 of the slider 502 adjacent to the polymer molecules 516 is protected. The portions 514 of the surface of the slider 502 which were not protected is partially ion milled away creating a recession distance between the protected surface 518 and the unprotected surface 520. FIG. 5g shows the slider 502 after the remaining polymer 516 and the layer of polymer initiation 504 have been removed.

Figure 5H:
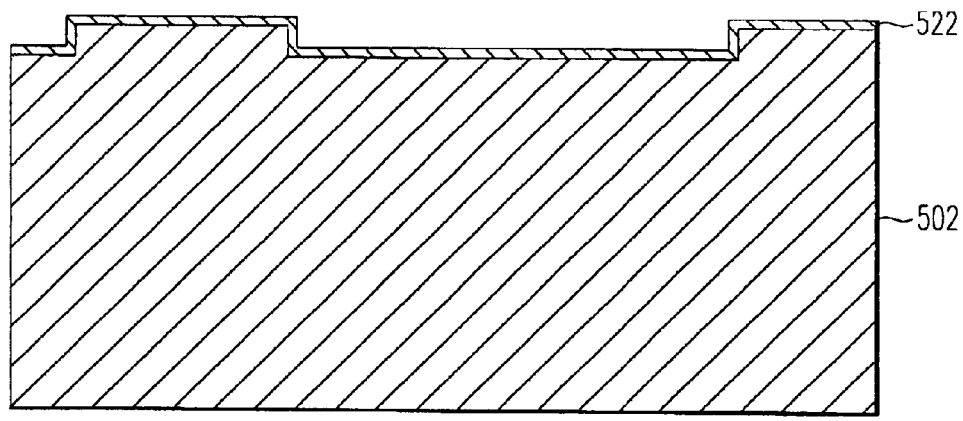
FIG. 5h illustrates the slider after a second layer of polymerization initiator has been applied.
Figure 5I:
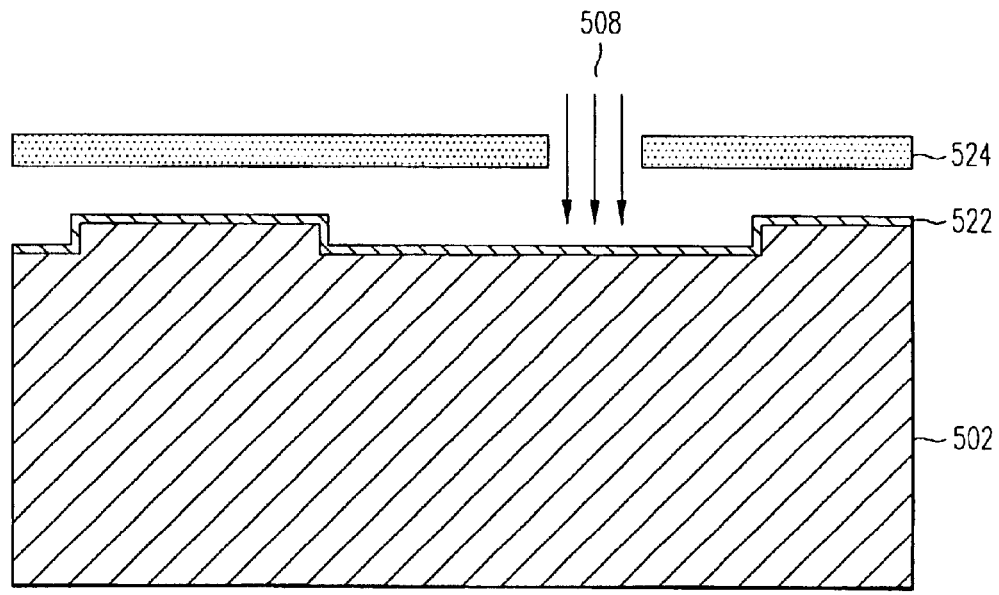
FIG. 5i illustrates the exposure of the slider to UV light through a second mask.
Figure 5J:
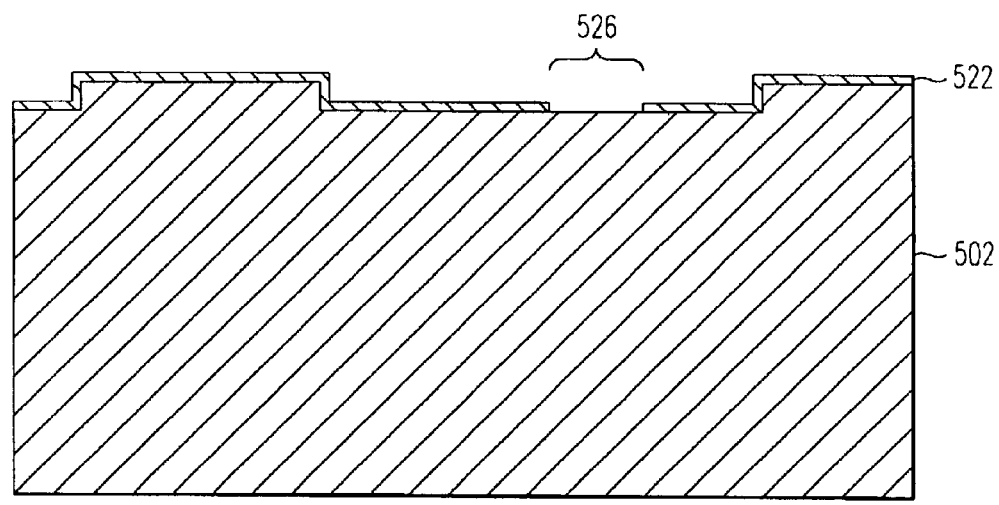
FIG. 5j illustrates the single slider after removal of the exposed portions of the second layer of polymerization initiator.
Figure 5K:
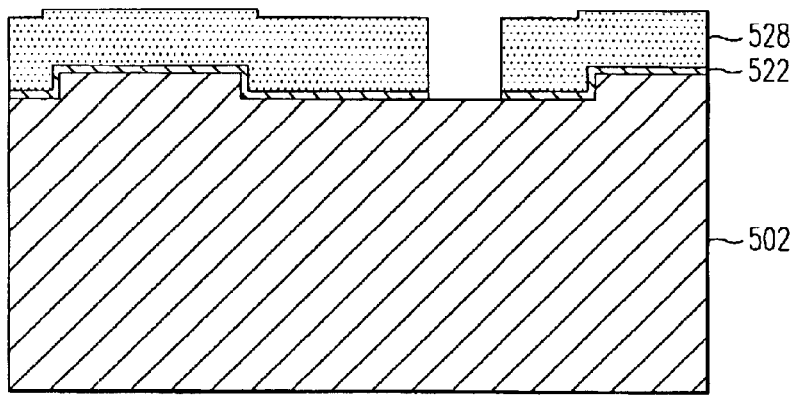
FIG. 5k illustrates the formation of a second polymer brush.
Figure 5L:
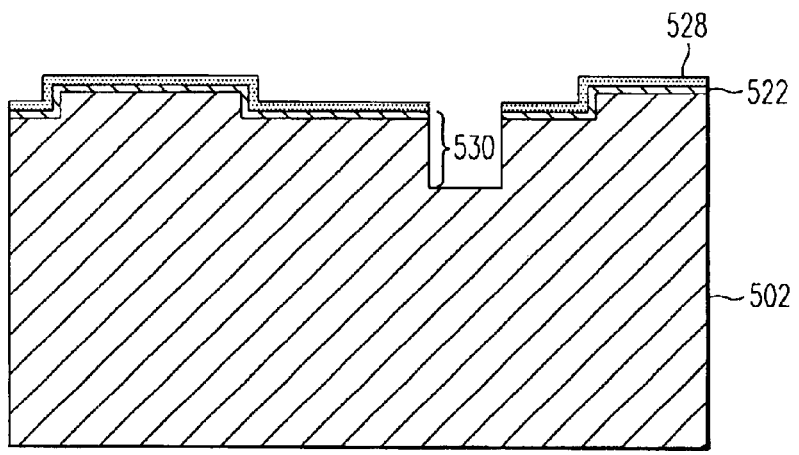
FIG. 5l illustrates the slider after a second ion milling.
Figure 5M:
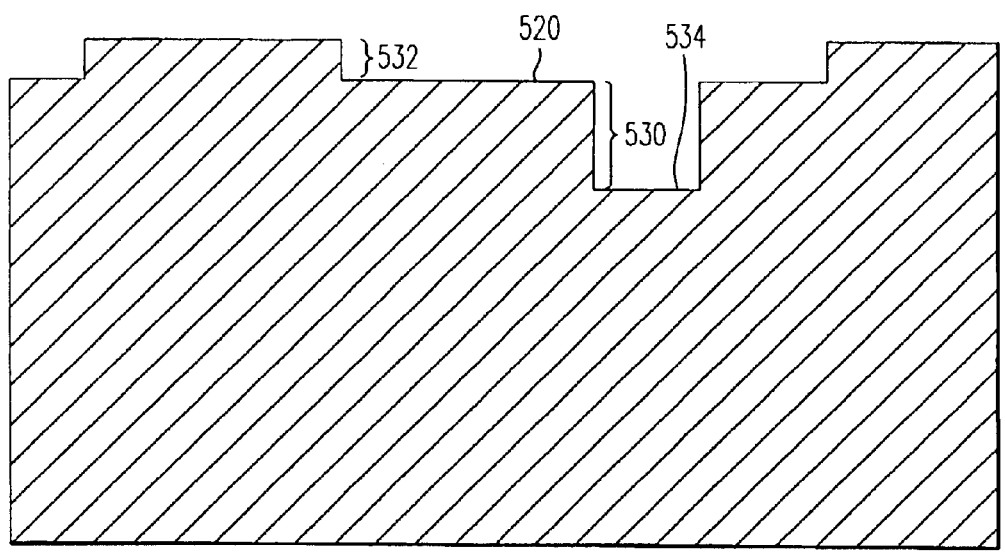
FIG. 5m illustrates the finished air bearing on the slider.

As was illustrated in FIG. 2, air bearings may have more than two surfaces which have different offset or recessed distances. When another surface is desired, the method outlined in FIGS. 5a–g is repeated starting with the slider 502 as illustrated in FIG. 5g. FIG. 5h illustrates the application of a second layer of polymer initiation 522 on the side of the slider 502 having the air bearing. FIG. 5i shows exposure of the second layer of polymer initiation 522 to UV light 508 though a second mask 524. FIG. 5j illustrates the portion 526 of the slider surface which has deactivated polymerization initiator. FIG. 5k illustrates the second polymer brush 528 as grown on the polymer initiation layer 522. FIG. 5l illustrates the remaining polymer brush 528 after ion milling. Reactive ion etching is a more aggressive method of removing material and may be appropriate for use since the recessed distance 530 of the last surface 534 is generally greater than the recessed distance 532 of the second surface 520. Finally, FIG. 5m shows the finished air bearing after removal of the polymer brush and the layer of polymerization initiator.

Figure 6A:
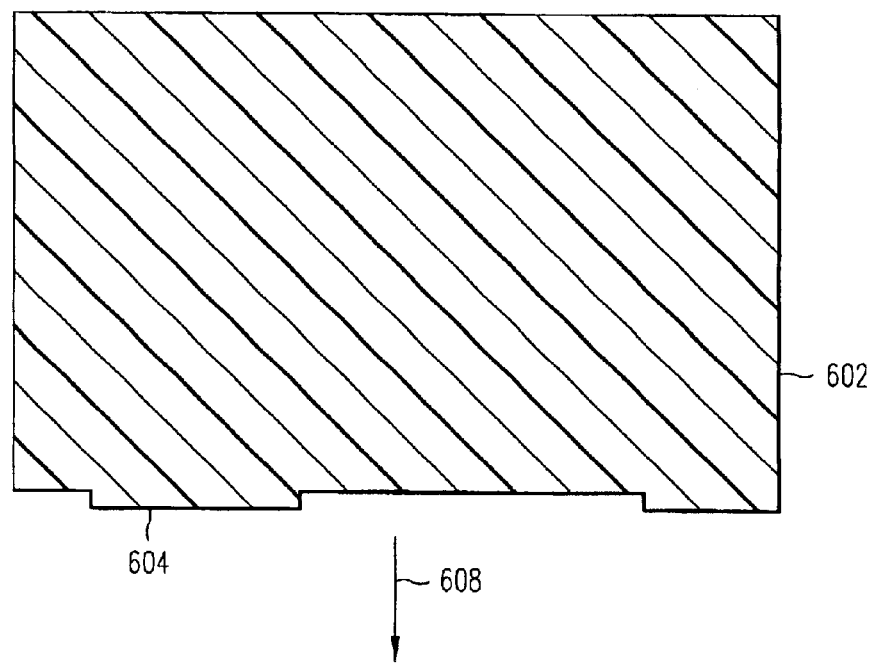
FIG. 6a illustrates a layer of polymerization initiator being applied to a stamping tool.
Figure 6A:
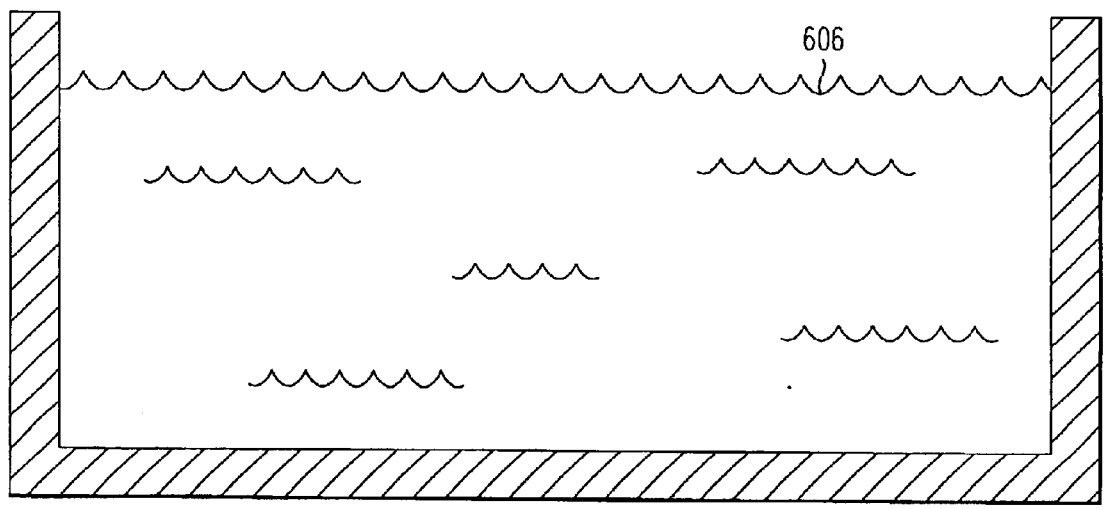
Figure 6B:
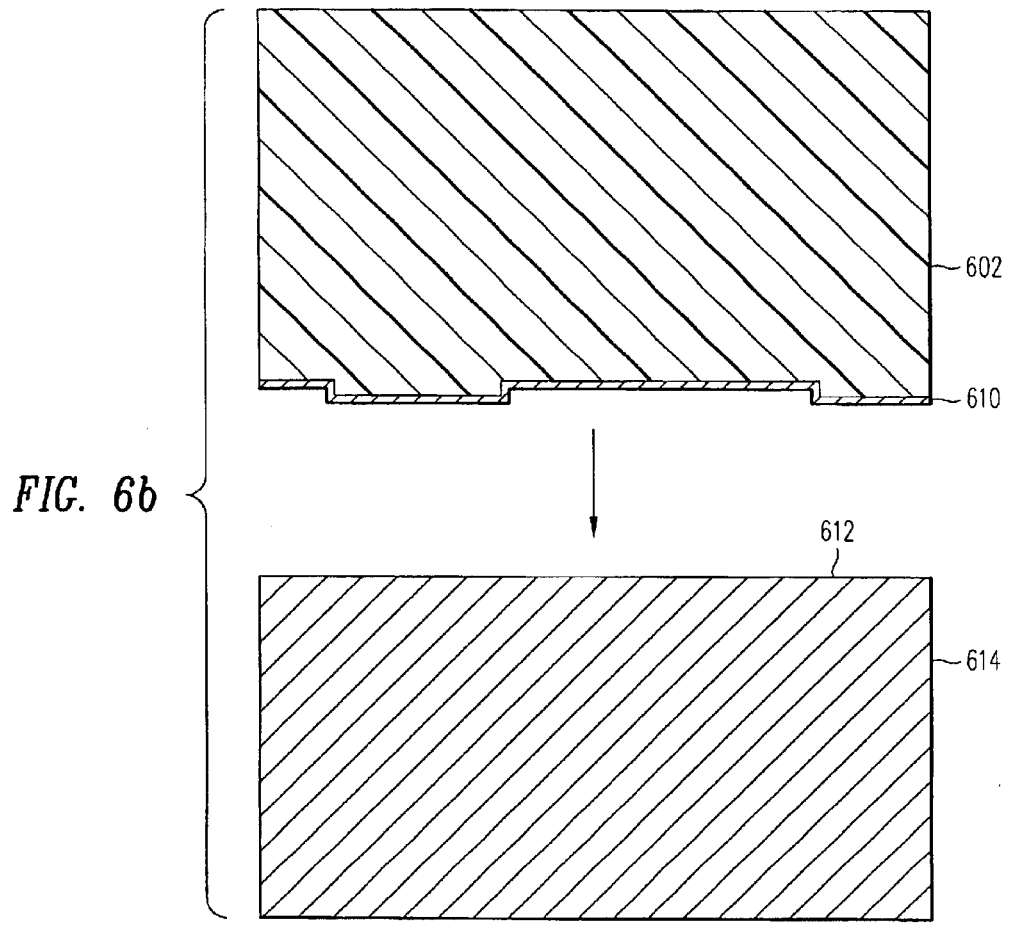
FIG. 6b illustrates the application of the layer of polymerization initiator to a single slider using the stamping tool.
Figure 6C:
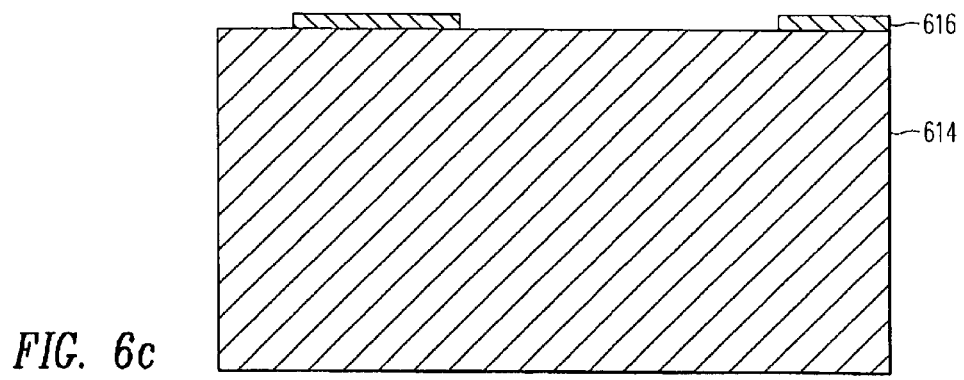
FIG. 6c illustrates the patterned layer of polymerization initiator on the single slider.
Figure 6D:
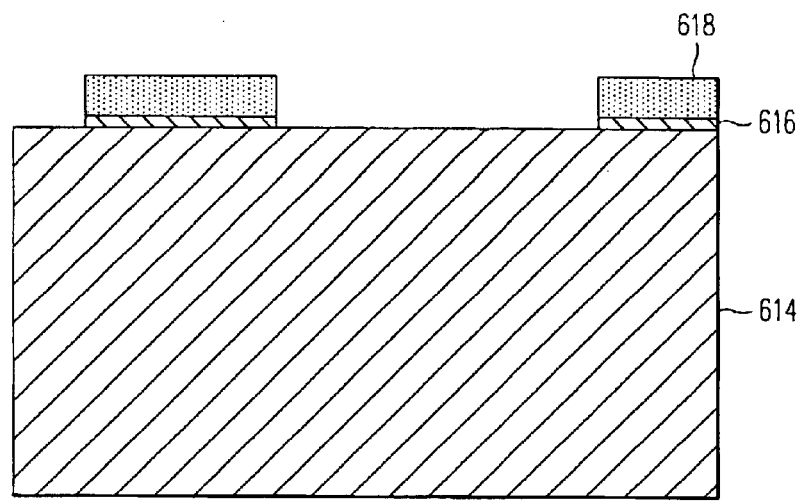
FIG. 6d illustrates the formation of the polymer brush.
Figure 6E:
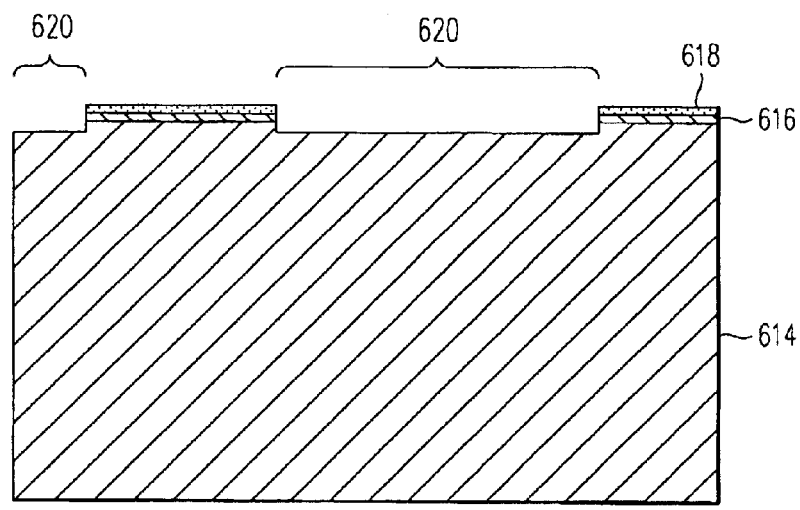
FIG. 6e illustrates the slider after ion milling.
Figure 6F:
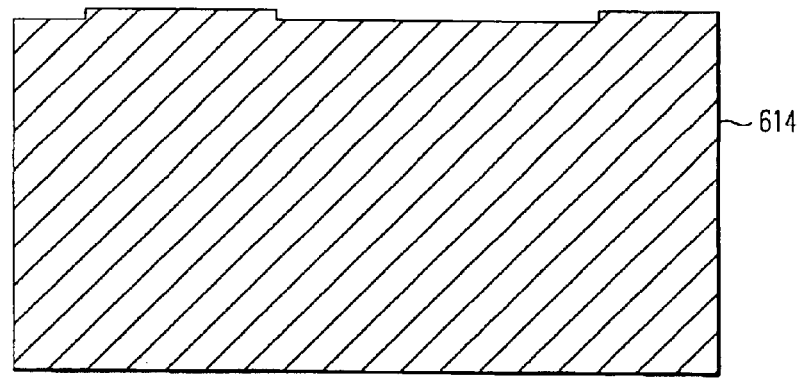
FIG. 6f illustrates the slider after removal of the polymer brush and the layer of polymerization initiator.

In an alternate embodiment of the invention, the layer of polymerization initiator is applied by a stamping method as illustrated in FIGS. 6a–l. The illustrations in FIGS. 6a–l are not to scale. Referring to FIG. 6a, a stamping tool 602 has a pattern on one surface 604 similar to the pattern in the mask previously illustrated in FIG. 5c. This pattern on the stamping tool 602 is preferably constructed by creating an offset portion of the surface by etching, ion milling, or any other suitable means. The stamping tool 602 may be conveniently constructed from a relatively soft material such as silicone. The layer of polymerization initiator may then be applied to the stamping tool 602 by dipping 608 into a solution 606 containing the polymerization initiator as illustrated in FIG. 6a. The layer of polymerization initiator may also be applied to the stamping tool by other means such as contact coating referred to as "inking". FIG. 6b illustrates the stamping tool 602 having the layer of polymerization initiator 610 being applied to the intended air bearing side 612 of the slider 614. Referring to FIG. 6c, after pressing the stamping tool 602 to the slider 614, the layer of polymerization initiator 610 is transferred to the slider 614 for those portions of the stamping tool 602 with raised surfaces corresponding to the desired pattern. In this embodiment, the layer of polymerization initiator 616 on the slider has the desired pattern which existed on the stamping tool 602 and therefore does not need exposure to UV light or additional masks. The polymer brush 618 is formed as illustrated in FIG. 6d. FIG. 6e illustrates the slider 614 after treatment with ion milling. In FIG. 6e the recessed regions 620 created by ion milling are illustrated. FIG. 6f illustrates the slider 614 after the removal of the layer of polymerization initiator 616 and the polymer brush 618.

Figure 6G:
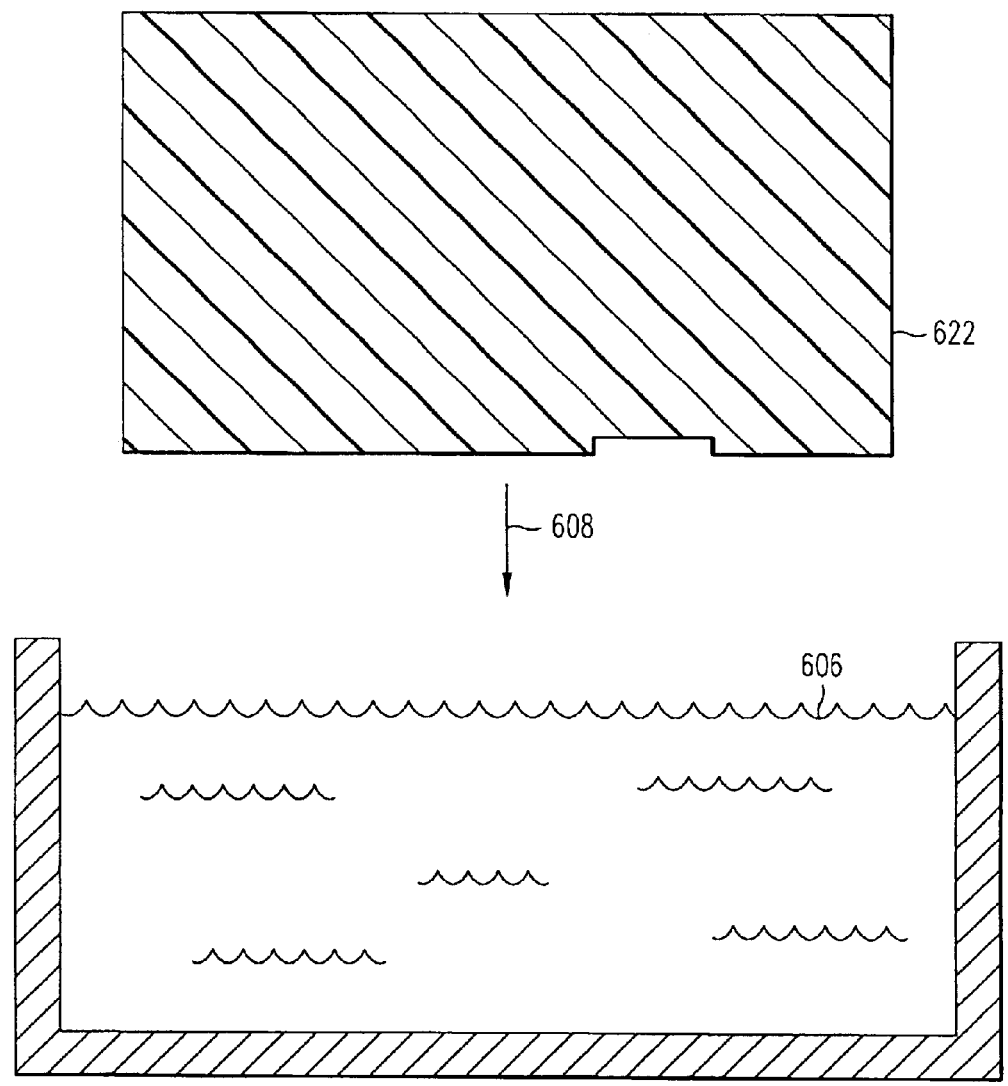
FIG. 6g illustrates the application of a second layer of polymerization initiator to a second stamping tool.
Figure 6H:
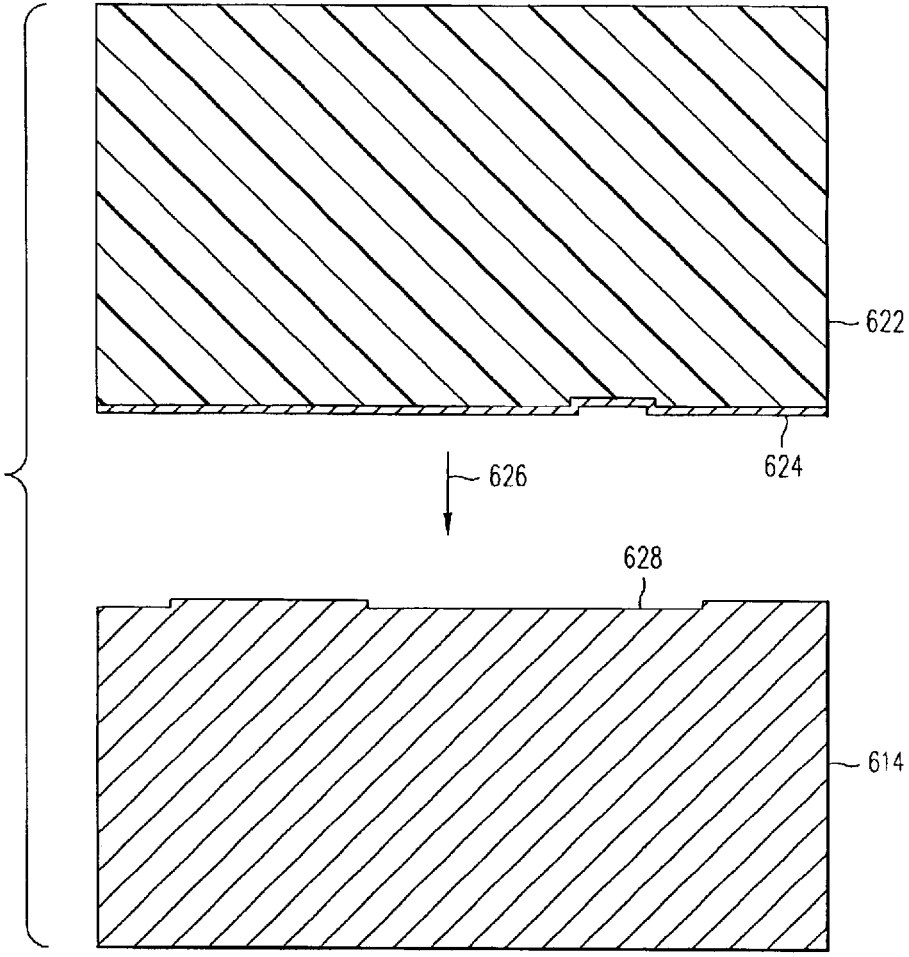
FIG. 6h illustrates the deposition of the second layer of polymerization initiator to the slider using the second stamping tool.
Figure 6I:
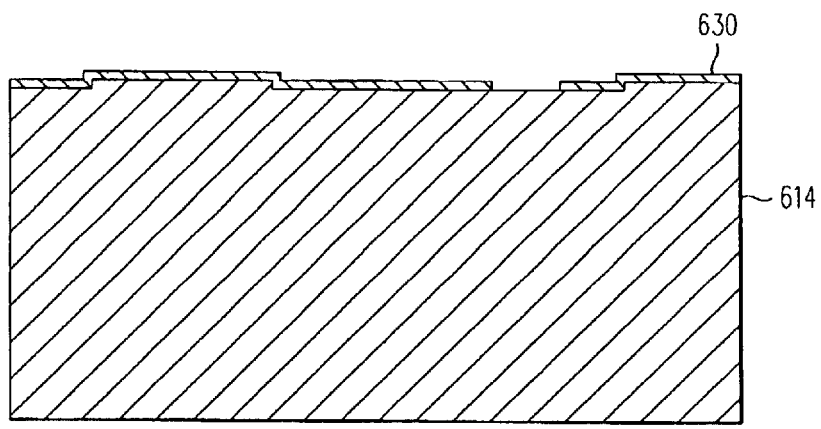
FIG. 6i illustrates the single slider and the patterned layer of polymerization initiator.
Figure 6J:
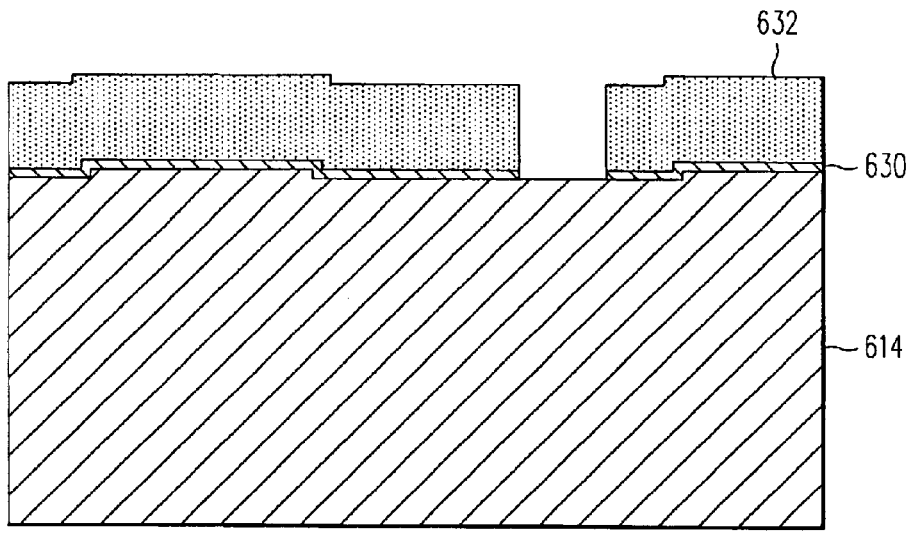
FIG. 6j illustrates the formation of the second polymer brush.
Figure 6K:
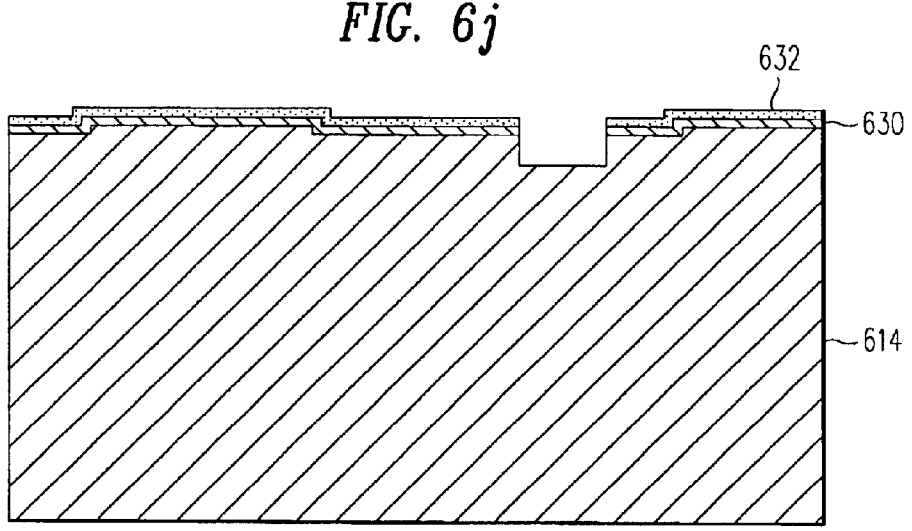
FIG. 6k illustrates the single slider after the second ion milling.
Figure 6L:
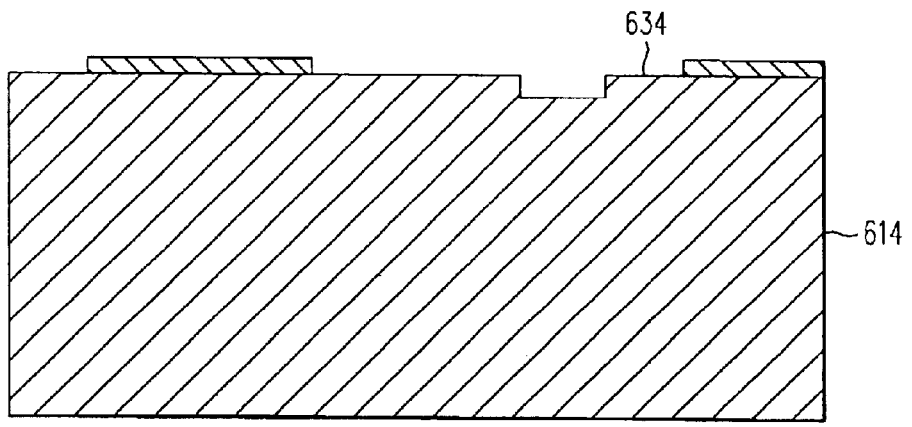
FIG. 6l illustrates the single slider with a finished air bearing.

If additional surfaces are desired in the air bearing, then the process illustrated in FIGS. 6a–6f may be repeated using a different stamping tool 622. FIG. 6g illustrates the application 608 of the polymerization initiator 606 to another stamping tool 622. FIG. 6h illustrates the second stamping tool 622 with the second layer of polymerization initiator 624 being pressed 626 to the slider 614 with a partially formed air bearing 628. FIG. 6i illustrates the slider 614 after application of the second layer of polymerization initiator 630 using the second stamping tool 622. FIG. 6j illustrates the slider 614 after the formation of the second polymer brush 632. FIG. 6k illustrates the slider 614 after the second ion milling or reactive ion etching. Finally, FIG. 6l illustrates the slider 614 with the finished air bearing 634 after removal of the layer of polymerization initiator and the polymer brush.

The stamping method discussed in detail above and illustrated in FIGS. 6a–l is particularly suitable for single slider processing. Maintaining alignment of a stamping tool capable of stamping all the sliders in row form is a difficult task.

From the foregoing it will be apparent that the embodiments of the invention provide for an advantageous and effective method of constructing an air bearing on a single slider. Although specific embodiments of the invention have been described in detail, the invention is not limited to the examples so described and illustrated, but instead is limited only by the claims.

We claim:

1. A method for constructing an air bearing on a surface of a single slider, comprising:

applying a layer of polymerization initiator to the surface of the single slider;

exposing a portion of the layer of polymerization initiator through a mask with UV light;

forming a layer of polymer brush on the layer of polymerization initiator;

milling the single slider with an ion mill; and, removing the layer of polymer brush and a remaining layer of polymerization initiator.

2. A method for constructing an air bearing on a surface of a single slider as in claim 1, wherein the single slider comprises substantially pure silicon.

3. A method for constructing an air bearing on a surface of a single slider as in claim 1, wherein the single slider comprises a composite of alumina and titanium carbide.

4. A method for constructing an air bearing on a surface of a single slider as in claim 1, wherein the layer of polymerization initiator comprises azomonochlorsilane.

5. A method for constructing an air bearing on a single slider, said air bearing having two or more areas with different recessed distances, comprising:

applying a layer of polymerization initiator to the surface of the single slider;

exposing a portion of the layer of polymerization initiator through a mask with UV light;

forming a layer of polymer brush on the layer of polymerization initiator;

milling the single slider with an ion mill; and, removing the layer of polymer brush and a remaining layer of polymerization initiator.

6. A method for constructing an air bearing on a surface of a single slider as in claim 5, wherein the single slider comprises substantially pure silicon.

7. A method for constructing an air bearing on a surface of a single slider as in claim 5, wherein the single slider comprises a composite of alumina and titanium carbide.

8. A method for constructing an air bearing on a surface of a single slider as in claim 5, wherein the layer of polymerization initiator comprises azomonochlorsilane.

9. A method for constructing an air bearing on a surface of a single slider, comprising:

applying a layer of polymerization initiator to a stamp;

applying the layer of polymerization initiator to the surface of the single slider using the stamp;

forming a layer of polymer brush on the layer of polymerization initiator;

milling the single slider with an ion mill; and, removing the layer of polymer brush and a remaining layer of polymerization initiator.

10. A method for constructing an air bearing on a surface of a single slider as in claim 9, wherein the single slider comprises substantially pure silicon.

11. A method for constructing an air bearing on a surface of a single slider as in claim 9, wherein the single slider comprises a composite of alumina and titanium carbide.

12. A method for constructing an air bearing on a surface of a single slider as in claim 9, wherein the layer of polymerization initiator comprises azomonochlorsilane.

13. A method for constructing an air bearing on a single slider, said air bearing having two or more areas with different recessed distances, comprising:

applying a layer of polymerization initiator to a stamp;

applying the layer of polymerization initiator to the surface of the single slider using the stamp;

forming a layer of polymer brush on the layer of polymerization initiator;

milling the single slider with an ion mill; and, removing the layer of polymer brush and a remaining layer of polymerization initiator.

14. A method for constructing an air bearing on a surface of a single slider as in claim 13, wherein the single slider comprises substantially pure silicon.

15. A method for constructing an air bearing on a surface of a single slider as in claim 13, wherein the single slider comprises a composite of alumina and titanium carbide.

16. A method for constructing an air bearing on a surface of a single slider as in claim 13, wherein the layer of polymerization initiator comprises azomonochlorsilane.

* * * * *